United States Patent [19]

Belart

[11] Patent Number: 4,492,082

[45] Date of Patent: Jan. 8, 1985

[54] MASTER CYLINDER FOR HYDRAULICALLY ACTUATED BRAKES FOR AUTOMOTIVE VEHICLES

[75] Inventor: Juan Belart, Walldorf, Fed. Rep. of Germany

[73] Assignee: ITT Industries, Inc., New York, N.Y.

[21] Appl. No.: 472,325

[22] Filed: Mar. 4, 1983

[30] Foreign Application Priority Data

May 21, 1982 [DE] Fed. Rep. of Germany ....... 3219134

[51] Int. Cl.³ .............................................. F15B 7/08
[52] U.S. Cl. ........................................ 60/589; 60/592
[58] Field of Search ......................... 60/585, 589, 592; 251/211, 120, 332

[56] References Cited

U.S. PATENT DOCUMENTS 4,114,378 9/1978 Stanuszek .............................. 60/589

FOREIGN PATENT DOCUMENTS 2140635 3/1972 Fed. Rep. of Germany ...... 251/332
100475 6/1962 Norway ............................... 251/332
954422 4/1964 United Kingdom ................ 60/585

Primary Examiner—Robert E. Garrett
Assistant Examiner—Scott L. Moritz
Attorney, Agent, or Firm—James B. Raden; Edward J. Brosius

[57] ABSTRACT

A master cylinder for hydraulically actuated brakes for automotive vehicles includes at least one master cylinder piston with a piston return spring anchored by a central clamping member and a valve body which is slidable relative to the master cylinder piston and which opens a compensating port in the master cylinder piston when the return spring is relieved. The valve body carries an elastic sealing element at its end face close to the compensating port. The outer diameter of the elastic sealing element is greater than the diameter of the compensating port. A pin shaped on the valve body extends through the sealing element and is adapted to plunge into the compensating port on approach of the valve body to the piston end surface which surrounds the compensating port, thus preventing the sealing element from penetrating into the compensating port.

10 Claims, 2 Drawing Figures

MASTER CYLINDER FOR HYDRAULICALLY ACTUATED BRAKES FOR AUTOMOTIVE VEHICLES

BACKGROUND OF THE INVENTION

The present invention relates to a master cylinder for hydraulically actuated brakes for automotive vehicles.

There are already known various constructions of master cylinders of the above type. In one known construction, the master cylinder includes at least one master cylinder piston with a piston return spring anchored by a central clamping member and a valve body which is slidable relative to the master cylinder piston and opens a compensating port in the master cylinder piston when the piston return spring is relieved and which carries at its end face close to the compensating port an elastic sealing element whose outer diameter is greater than the diameter of the compensating port.

The master cylinder piston is guided in a cylinder bore of a housing in an axially slidable and sealed relationship. An end face of the piston that is close to the brake pedal delimits a chamber that is connected to a return reservoir. The end face of the master cylinder piston that is remote from the pedal delimits a working chamber which is adapted to be pressurized upon brake pedal actuation. The chambers on the two sides of the master cylinder piston are interconnected when the brake pedal is released, that is, when the brake is not actuated, by a compensating port or passage which centrically opens onto the end surface of the master cylinder piston which faces to the working chamber. In alignment with this compensating port, there is accommodated in the working chamber a valve body slidable relative to the master cylinder and carrying an elastic sealing element by which the compensating port can be closed upon brake application.

The inactive position of the arrangement is brought about by a piston return spring acting on the bottom of the master cylinder and on the master cylinder piston, as well as by a valve closure spring acting on the valve body. Besides, a clamping member is shaped at the valve body, which keeps the elastic sealing element at a maximum distance from the compensating port when the brake is released.

When an actuating force is transmitted via a brake pedal to the master cylinder piston upon brake application, first the piston return spring which acts on the master cylinder piston and on the bottom of the master cylinder is compressed, as a result of which the valve closure spring is relieved by the same amount so that the elastic sealing element moves in the direction toward the compensating port. When the actuating force is of a sufficiently great magnitude, the sealing element contacts the piston around the compensating port and thus causes interruption of the connection between the working chamber of the master cylinder and the return reservoir. Upon further displacement of the master cylinder piston, the working chamber of the master cylinder that is remote from the pedal will be pressurized, and an actuation of the wheel brakes connected to this working chamber is initiated thereby. During the brake-release action, the master cylinder piston will be gradually returned to such an extent that the elastic sealing element eventually lifts from the surface surrounding the compensating port, and both the working chamber of the master cylinder and the wheel brakes become unpressurized.

Master cylinders of the above type incorporating so-called central valves have the advantage, in comparison with sleeve-sealed master cylinders, that there is no need for a so-called breather bore which has to be traveled over regularly when the brake is applied. When traveling over such breather bores, the sleeve seals are subjected to relatively high wear. In particular in a combination with an anti-skid control unit, it is possible that very high pressures develop in the working chamber already in the case of small actuating travels of the master cylinder pistons. It cannot be excluded under such circumstances that the sleeve seal is pressed by the high pressure differences acting on it into the breather bore and is rendered inoperative thereby.

However, it has been established even in connection with the master cylinders with central valves as described above that the elastic sealing element is similarly pressed into the central compensating port under specific operating conditions. If this is a frequent occurrence, even in this case the sealing element may become brittle as a result of the large extent of deformations or may be sheared off at the edges of the compensating port, respectively. As a result, the sealing effect of the elastic sealing element is considerably impaired.

SUMMARY OF THE INVENTION

Accordingly, it is a general object of the present invention to avoid the disadvantages of the prior art.

More particularly, it is an object of the present invention to provide a master cylinder which does not possess the disadvantages of the known master cylinders.

It is yet another object of the present invention so to construct the master cylinder of the type here under consideration as to reduce the wear of sealing elements to a minimum, if not eliminate the same altogether.

Still another object of the present invention is so to design the master cylinder of the above type as to be simple in construction, inexpensive to manufacture, and reliable in operation nevertheless.

In pursuance of these objects and others which will become apparent hereafter, one feature of the present invention resides in a master cylinder for use in a vehicle hydraulic braking system including a hydraulic fluid reservoir, for controlling the pressure of hydraulic fluid acting on at least one hydraulically actuated brake, in dependence on the position of a brake operating member, this master cylinder comprising a cylinder member bounding an internal bore centered on an axis; at least one piston sealingly and axially displaceably received in the bore and having an end surface that delimits a working chamber in the bore; means for communicating the working chamber with the brake; means for axially displacing the piston member in response to changes in the position of the brake operating member; means for defining in the piston member a compensating passage that is in communication with the reservoir and has an axially extending portion which opens onto the aforementioned end surface of the piston member; and means for establishing and interrupting communication between the compensating passage and the working chamber in dependence on the position of the piston member in the bore, including a valve body accommodated in the working chamber, a pin-shaped projection extending axially from the valve body toward the compensating passage portion and having such a cross section as to register only with the latter, and an annular elastic sealing element surrounding at least that portion of the pin-shaped projection which is closest to the valve body and operative for sealingly contacting the end surface of the piston member around the compensating passage portion upon predetermined displacement of the piston member toward the valve body while the pin-shaped projection is out of contact with the end surface and prevents penetration of the sealing element into the compensating passage portion. Particularly advantageous results are obtained when the pin-shaped projection has such an axial length as to plunge into the compensating passage portion prior to the establishment of contact of the sealing element with the end surface of the piston member.

A particular advantage accomplished by this construction is that the elastic sealing element is reinforced, not only on the outside by the valve body as in known constructions, but also on the inside by the pin-shaped projection, thus excluding large elastic and plastic deformation from the very beginning. A master cylinder with a central valve will be obtained thereby which operates extremely wear-free as far as the sealing elements are concerned and therefore ensures their long life even under extreme working conditions which are occasioned in particular in the combination with a brake slip control unit.

Futhermore, it has been found to be advantageous to conform the dimensions of the compensating passage portion or port to those of the pin-shaped projection or pin especially in such a manner that the pin is received in the compensating port with a small radial clearance. Already by using this expedient the elastic sealing element is to a large degree prevented from moving into the compensating port even upon occurrence of high pressure differences. This function may even be improved in that the pin extends beyond the bounding surface of the sealing element which is close to the compensating port. If the pin has such a long axial dimension, there will be precluded all possibility of the sealing element flowing or being deformed into the compensating port during or after lifting from the surface surrounding the compensating port, since first of all the pin releases only a very narrow radial gap.

Another advantageous feature of the present invention can be found in that the sealing element is of a substantially hollow-cylindrical or tubular shape and forms a radial annular gap with the pin in the area close to the compensating port. It will be achieved by such a design that the end of the elastic sealing element close to the compensating port is able to deform easily into the gap such as to ensure tight closing of the compensating port upon application of the brake. Under corresponding pressure loads, the sealing element abuts tightly on the peripheral surface of the pin even in the area of the annular gap. The annular gap can be obtained, on the one hand, in that the diameter of the internal bore of the sealing element is increased in the area of the annular gap; on the other hand, it is possible to reduce the diameter of the pin inwardly in the area of the annular gap.

As has been pointed out above, the diameter of the pin is dimensioned only insignificantly smaller than that of the compensating port. To reliably ensure plunging of the pin into the compensating port, the pin is tapered or otherwise reduced in cross-section at its end which is to plunge into the compensating port. It will be thereby precluded that the axial end surface of the pin would contact the axial end surface of the master cylinder piston and that the central valve would be hindered in closing. Preferably, the tapered end of the pin is chamfered or rounded off. An advantageous construction will be further attained if the inner diameter of the sealing element is conformed to the diameter of the compensating port in the area of the annular gap.

BRIEF DESCRIPTION OF THE DRAWING

The above-mentioned and other features and objects of the invention will become more apparent by reference to the following description taken in conjunction with the accompanying drawing in which.

DETAILED DESCRIPTION OF THE PREFERRED EMBODIMENTS

Figure 1:
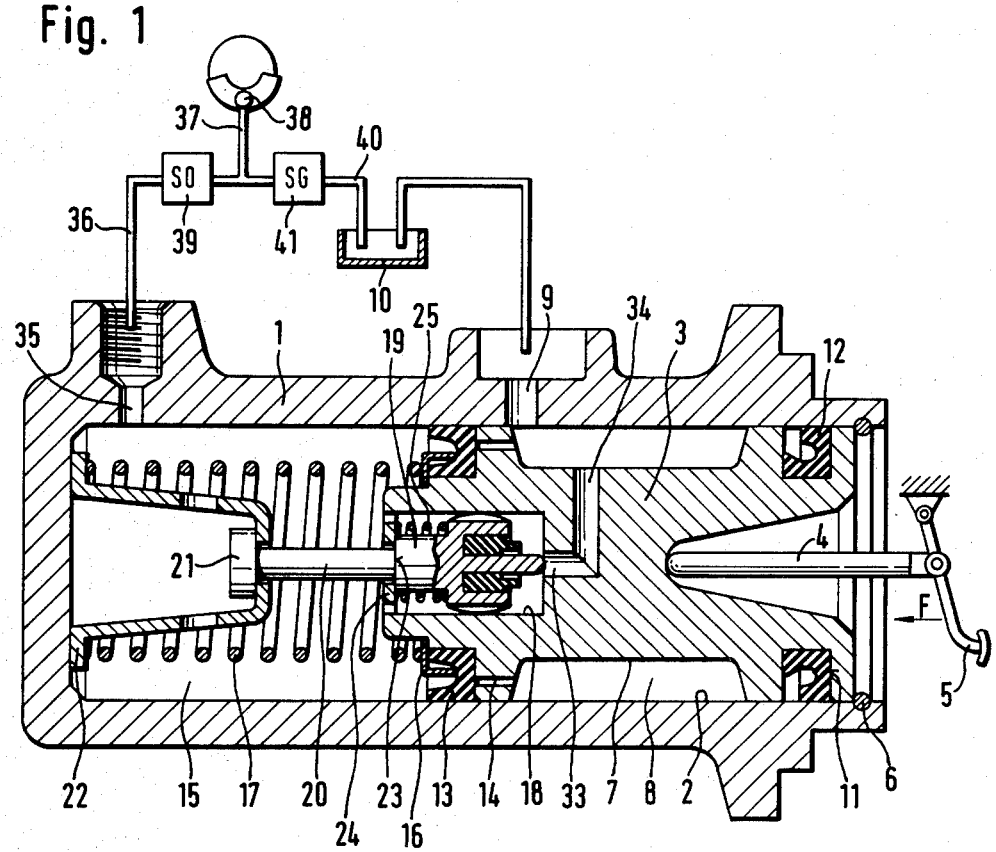
FIG. 1 is a longitudinal sectional view of a master cylinder of the present invention.

Referring now to the drawing in detail, and first to FIG. 1 thereof, it may be seen that the reference numeral 1 designates a housing of a master cylinder. The housing 1 bounds an axial cylinder bore 2 in which a master cylinder piston 3 is received and guided in an axially slidable and sealed relationship. The end of the master cylinder piston 3 that is on the right as considered in the drawing is adapted to be acted upon by a push rod 4 which is connected to a brake operating member or pedal 5. The extent of movement of the master cylinder piston 3 in the rightward direction is limited by suitable stops 6. On its peripheral surface, the master cylinder piston 3 has a radial groove 7 that delimits a peripheral annular chamber 8 at the periphery of the master cylinder piston 3. The chamber 8 communicates via a housing port 9 with an unpressurized supply reservoir 10. The peripheral surface of the master cylinder piston 3 which moves in contact with the surface of the housing 1 that bounds the axial cylinder bore 2 is also provided to the right of the peripheral annular chamber 8 with another radial groove 11 in which there is accommodated an annular seal 12 serving to avoid leakage from the housing 1.

The end of the master cylinder piston 3 that is on the left in the drawing carries a sleeve seal 13. An axial bounding surface of the seal 13 that faces toward the pedal 5 is acted upon by hydraulic fluid admitted thereto via axial channels 14 provided in the piston 3 and communicating with the peripheral annular chamber 8. The sleeve seal 13 is arranged in such a manner as to allow pressure fluid to flow exclusively from the peripheral annular chamber 8 to a working chamber 15 of the master cylinder but not in the opposite direction. The sleeve seal 13 is held in position by a rotationally symmetric retaining member 16 which, at the same time, serves as an abutment for a piston return spring 17.

The end face of the master cylinder piston 3 that is close to the working chamber 15 is provided with an axial blind bore 18 in which a valve closure member 19 is axially movably received. The valve closure member 19 continues in the leftward direction as considered in the drawing in the form of a clamping member 20 that limits the movement of the valve closure member 19 in the direction toward the brake pedal 5. For this purpose, the end of the clamping member 20 that is on the left in the drawing is shaped as a retaining head 21 which, in turn, is supported in a cup-shaped spring support member 22. The spring support member 22 simultaneously serves to support the piston return spring 17.

The movement of the valve closure member 19 in the direction toward the working chamber 15 is limited by a projection 23 which engages projections 24 of the master cylinder piston 3 in the illustrated brake-release position. The valve body 19 is preloaded by a valve closure spring 25 in the direction toward the brake pedal 5.

Figure 2:
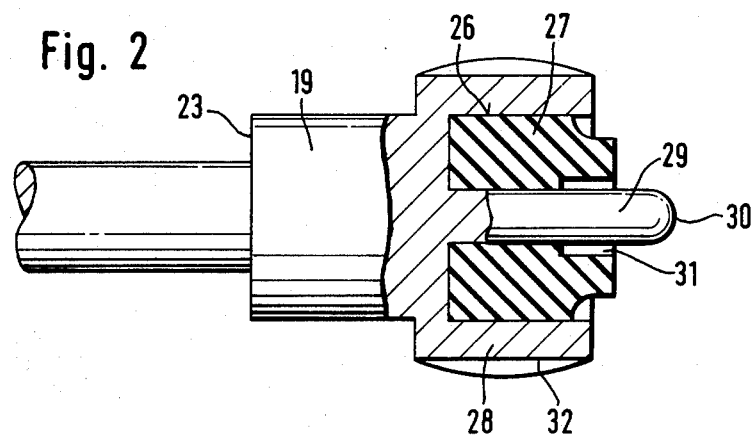
FIG. 2 is an enlarged view of a valve body embodied in the master cylinder of FIG. 1.

As can be seen in more detail from FIG. 2, there is provided in the end of the valve closure member 19 that is close to the pedal 5 a cross-sectionally circular axial recess 26. A substantially hollow-cylindrical or tubular sealing element 27 is received in the recess 26. Owing to the provision of the recess 26, there is formed an outer reinforcement 28 for the sealing element 27. In addition, the valve closure member 19 is provided with an axial pin 29 that extends axially through the recess 26 and against which the inner peripheral surface of the sealing element 27 will bear. The pin 29 extends beyond the axial end surface of the sealing element 27 that faces in the rightward direction and is provided with chamfers and/or rounded-off portions 30 at its end that is close to the pedal 5. The substantially hollow-cylindrical sealing element 27 forms an annular gap 31 with the pin 29 in the area close to the pedal 5. To this end, the diameter of the inner bore of the sealing element 27 is enlarged in this area to form the annular gap 31. However, in an alternative that is not shown, the diameter of the pin 29 would be reduced by the same amount to provide the annular gap 31. Axial grooves 32 are provided on the outer periphery of the valve closure member 19 to let hydraulic fluid bypass the latter.

It can be seen from FIG. 1 that a connection exists between the peripheral annular chamber 8 and the axial blind bore 18 in the master cylinder piston 3. This connection is established by an axial compensating port 33 which opens onto the bottom of the axial blind bore 18 and continues as a radial channel 34 that opens into the peripheral annular chamber 8. It is currently preferred that the ports 33, 34 be shaped as cross-sectionally circular bores and that the pin 29 be of a circular cross section, with the compensating port 33 having an only insignificantly larger diameter than the pin 29.

The housing 1 of the master cylinder is provided with another housing port 35 which opens into the working chamber 15 and which is connected to a wheel brake 38 via a conduit 36, 37. Inserted into this conduit 36, 37 is an electromagnetically actuatable valve 39 which in its deenergized state, i.e. when it is not activated, opens the connection between the housing port 35 and the wheel brake 38. The valve 39 will close this connection when correspondingly actuated by an electronic anti-skid control arrangement that is not illustrated. The wheel brake 38 is also provided with a normally closed connection 40 to the unpressurized return reservoir 10. The connection 40, when open, renders it possible to effect pressure decrease in the wheel brake 38, if necessary, even as an actuating force F acting on the brake pedal 5 remains unchanged. The interruption and establishment of the connection between the wheel brake 38 and the unpressurized supply reservoir 10 are effected by a solenoid valve 41 inserted in the connection 40. The valve 41 is closed when deenergized and can be actuated or opened in the same manner as the valve 39 by the aforementioned anti-skid control arrangement.

The mode of operation of the brake unit shown in FIG. 1 will be described in more detail in the following with reference to FIG. 2. In the brake-release position shown in FIG. 1, all parts will assume the illustrated position. Due to the action of the piston return spring 17, the master cylinder piston 3 is in its rightward end position as considered in the drawing and is in abutment with the stops 6. Due to the action of the valve closure spring 25, the valve closure member 19 is also in its closest possible end position to the brake pedal 5, in which the retaining head 21 bears against the spring support members 22 and in which the compensating port 33 is released.

When the actuating force F is applied on the brake pedal 5, first the piston return spring 17 will be compressed. As a result of this, the pin 29 slides into the compensating port 33 to an extent corresponding to the distance the master cylinder piston 3 has traveled, and the connection 33, 34 between the peripheral annular chamber 8 and the working chamber 15 will be interrupted after abutment of the sealing element 27 on the master cylinder piston 3. Now the working chamber 15 can be pressurized by increasing the force F active on the brake pedal 5, so that pressure will build up in the wheel brake 38, too.

During the brake-release action, the master cylinder piston 3 will be gradually moved to its brake-release position shown in the drawing, enabling fluid to flow from the outer peripheral chamber 8 via the axial channels 14 into the working chamber 15 to replenish the supply of the fluid in the latter. Finally, the sealing element 27 lifts from the bottom of the blind bore 18 thus re-establishing the connection 33, 34 between the unpressurized supply reservoir 10 and the working chamber 15 of the master cylinder and the wheel brake 38, respectively.

While I have described above the principles of my invention in connection with a specific arrangement, it is to be clearly understood that this description is made only by way of example and not as a limitation to the scope of my invention as set forth in the objects thereof and in the accompanying claims.

I claim:

1. A master cylinder for use in a vehicle hydraulic braking system, said system including a hydraulic fluid reservoir for controlling the pressure of hydraulic fluid acting on at least one hydraulically actuated brake in said system, said pressure of hydraulic fluid depending on the position of the brake operating member, said master cylinder comprising:

a cylinder member bounding an internal bore centered on an axis;

at least one piston sealingly and axially displaceably received in said bore and having an end surface that delimits a working chamber in said bore;

means for communicating said working chamber with the brake;

means for axially displacing said piston member in response to changes in the position of the brake operating member;

means for defining in said piston member a compensating passage that is in communication with the reservoir and has an axially extending portion which opens onto said end surface; and means for establishing and interrupting communication between said compensating passage and said working chamber in dependence on the position of said piston member in said bore, including a valve body slidably disposed in said working chamber, a pin-shaped projection extending axially from said valve body toward said compensating passage and having a cross section configuration adapted to register only with said compensating passage, and an annular elastic sealing element surrounding at least that portion of said pin-shaped projection which is closest to said valve body and operative for sealingly contacting said end surface of said piston member around said compensating passage portion upon predetermined displacement of said piston member toward said valve body while said pin-shaped projection is out of contact with said end surface, said pin-shaped projection and said sealing element bound with one another a gap of a predetermined internal dimension at least at the area thereof which is close to said end surface of said piston member, said internal dimension of said gap being larger than the internal dimension of said compensating passage whereby said sealing element is prevented from penetrating into said compensating passage upon said displacement of said piston member toward said valve body.

2. The master cylinder as defined in claim 1, wherein said pin-shaped projection has an axial length at least equal to the axial dimension of said sealing element to plunge into said compensating passage portion upon contact of said sealing element with said end surface.

3. The master cylinder as defined in claim 2, wherein said axial length exceeds said axial dimension so that said pin-shaped projection plunges into said compensating passage portion prior to establishment of contact of said sealing element with said end surface.

4. The master cylinder as defined in claim 1, wherein said compensating passage portion has a cylindrical cross section of a predetermined diameter, and wherein said sealing element has a cylindrical inner surface facing said pin-shaped projection and having a diameter substantially corresponding to said predetermined diameter.

5. The master cylinder as defined in claim 1, wherein said gap is annular and has a predetermined radial internal dimension at least at the area thereof which is close to said end surface of said piston member.

6. The master cylinder as defined in claim 5, wherein said sealing element has a cylindrical inner surface which faces said pin-shaped projection and which has an increased diameter at said area to provide said gap.

7. The master cylinder as defined in claim 6, wherein said pin-shaped projection has a cylindrical outer surface which faces said sealing element and which has a reduced diameter at said area to provide said gap.

8. A master cylinder for use in a vehicle hydraulic braking system, said system including a hydraulic fluid reservoir for controlling the pressure of hydraulic fluid acting on at least one hydraulically actuated brake in said system, said pressure of hydraulic fluid depending on the position of a brake operating member, said master cylinder comprising:

a cylinder member bounding an internal bore centered on an axis;

at least one piston sealingly and axially displaceably received in said bore and having an end surface that delimits a working chamber in said bore;

means for communicating said working chamber with the brake;

means for axially displacing said piston member in response to changes in the position of the brake operating member;

means for defining in said piston member a compensating passage that is in communication with the reservoir and has an axially extending portion which opens onto said end surface; and means for establishing and interrupting communication between said compensating passage and said working chamber in dependence on the position of said piston member in said bore, including a valve body slidably disposed in said working chamber, a pin-shaped projection extending axially from said valve body toward said compensating passage and having a cross section configuration adapted to register only with said compensating passage, and an annular elastic sealing element surrounding at least that portion of said pin-shaped projection which is closest to said valve body and operative for sealingly contacting said end surface of said piston member around said compensating passage portion upon predetermined displacement of said piston member toward said valve body while said pin-shaped projection is out of contact with said end surface and prevents penetration of said sealing element into said compensating passage portion, said end surface of said piston member bounding an axially extending recess that at least partially accommodates said valve body and includes a bottom surface portion in said recess; and wherein said compensating passage opens onto said bottom surface portion.

9. A master cylinder for use in a vehicle hydraulic braking system, said system including a hydraulic fluid reservoir for controlling the pressure of hydraulic fluid acting on at least one hydraulically actuated brake in said system, said pressure of hydraulic fluid depending on the position of a brake operating member, said master cylinder comprising:

a cylinder member bounding an internal bore centered on an axis;

at least one piston sealingly and axially displaceably received in said bore and having an end surface that delimits a working chamber in said bore;

means for communicating said working chamber with the brake;

means for axially displacing said piston member in response to changes in the position of the brake operating member;

means for defining in said piston member a compensating passage that is in communication with the reservoir and has an axially extending portion which opens onto said end surface; and means for establishing and interrupting communication between said compensating passage and said working chamber in dependence on the portion of said piston member in said bore, including a valve body slidably disposed in said working chamber, a pin-shaped projection extending axially from said valve body toward said compensating passage and having a cross section configuration adapted to register only with said compensating passage, and an annular elastic sealing element surrounding at least that portion of said pin-shaped projection which is closest to said valve body and operative for sealingly contacting said end surface of said piston member around said compensating passage portion upon predetermined displacement of said piston member toward said valve body while said pin-shaped projection is out of contact with said end surface and prevents penetration of said sealing element into said compensating passage portion, wherein said displacing means includes a piston return spring acting on said piston member and urging the same axially away from said valve body, and further comprising a further spring urging said valve member toward said end surface of said piston member.

10. The master cylinder as defined in claim 9, and further comprising means for limiting the extent of movement of said valve member in said working chamber in direction toward said end surface, including a support member having an abutment surface, and an extension rigid with said valve member and engaging said abutment surface until said piston member has conducted said predetermined displacement.

* * * * *